(12) United States Patent
Arnold et al.

(10) Patent No.: US 7,843,437 B1
(45) Date of Patent: Nov. 30, 2010

(54) HAND-HELD BROWSER TRANSCODING

(75) Inventors: Greg Arnold, Sunnyvale, CA (US); Fermin Soriano, Sunnyvale, CA (US)

(73) Assignee: PALM, Inc., Sunnyvale, CA (US)

( * ) Notice: Subject to any disclaimer, the term of this patent is extended or adjusted under 35 U.S.C. 154(b) by 2250 days.

(21) Appl. No.: 10/047,213

(22) Filed: Jan. 14, 2002

(51) Int. Cl.
*G09G 5/00* (2006.01)
(52) U.S. Cl. ............... 345/169; 178/18.01; 715/234
(58) Field of Classification Search ........... 345/3.3, 345/156–173, 698, 738, 744, 746, 838, 846, 345/853, 854, 855, 864, 866; 715/503, 767, 715/789, 794
See application file for complete search history.

(56) References Cited

U.S. PATENT DOCUMENTS

| | | | | |
|---|---|---|---|---|
| 5,060,170 A | * | 10/1991 | Bourgeois et al. | 715/788 |
| 5,281,146 A | * | 1/1994 | Janney | 434/348 |
| 5,923,323 A | * | 7/1999 | Chiu et al. | 715/767 |
| 6,104,334 A | * | 8/2000 | Allport | 341/175 |
| 6,151,622 A | * | 11/2000 | Fraenkel et al. | 709/205 |
| 6,266,684 B1 | * | 7/2001 | Kraus et al. | 715/513 |
| 6,300,947 B1 | * | 10/2001 | Kanevsky | 345/866 |
| 6,411,302 B1 | * | 6/2002 | Chiraz | 345/545 |
| 6,430,624 B1 | * | 8/2002 | Jamtgaard et al. | 709/246 |
| 6,522,347 B1 | * | 2/2003 | Tsuji et al. | 715/848 |
| 6,559,825 B2 | * | 5/2003 | Jacobsen et al. | 345/102 |
| 6,564,217 B2 | * | 5/2003 | Bunney et al. | 707/10 |
| 6,727,875 B1 | * | 4/2004 | Mikami et al. | 345/92 |
| 6,827,273 B2 | * | 12/2004 | Wilz et al. | 235/472.01 |
| 6,961,898 B2 | * | 11/2005 | Bennett | 715/212 |
| 7,082,576 B2 | * | 7/2006 | Shahine et al. | 715/789 |
| 7,188,318 B2 | * | 3/2007 | Spisak | 715/827 |
| 7,283,141 B2 | * | 10/2007 | Baar et al. | 345/647 |
| 7,362,311 B2 | * | 4/2008 | Filner et al. | 345/169 |
| 7,509,575 B2 | * | 3/2009 | Makela | 715/238 |
| 7,738,766 B2 | * | 6/2010 | Silverman et al. | 386/46 |
| 2002/0023112 A1 | * | 2/2002 | Avital | 707/513 |
| 2002/0046886 A1 | * | 4/2002 | Jones et al. | 177/144 |
| 2002/0059244 A1 | * | 5/2002 | Bunney et al. | 707/10 |
| 2002/0143811 A1 | * | 10/2002 | Bennett | 707/503 |
| 2002/0191031 A1 | * | 12/2002 | Ricard | 345/838 |
| 2003/0173405 A1 | * | 9/2003 | Wilz et al. | 235/462.01 |
| 2004/0049737 A1 | * | 3/2004 | Simon Hunt et al. | 715/513 |
| 2004/0070627 A1 | * | 4/2004 | Shahine et al. | 345/794 |
| 2004/0133848 A1 | * | 7/2004 | Hunt et al. | 715/500 |
| 2005/0236483 A1 | * | 10/2005 | Wilz et al. | 235/462.01 |

* cited by examiner

*Primary Examiner*—Nitin Patel

(57) ABSTRACT

A hand-held computer device with integral web page transcoding. A processor, forming a part of the handheld computer has a display coupled to the processor forming a part of the handheld computer, with the display having limited resolution of M×N pixels. A browser program running on the processor facilitates retrieving and viewing of a web page having size greater than M×N on the display. This is accomplished in a browser having an associated browser plug-in that transcodes the web page to a format adapted to the display. The transcoding is carried out by, among other things, generating a menu of frames from the web page to permit a user to select a desired frame for display by selecting frame titles as menu selections and compressing an image to a size suitable for display on the M×N resolution display.

17 Claims, 8 Drawing Sheets

HAND-HELD BROWSER TRANSCODING

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates to the field of browsers for viewing Internet content using a palmtop computer or other handheld device.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Such computer systems are implemented as Personal Digital Assistants (PDAs) and are finding their way into other hand-held devices such as cellular telephones.

While these palm sized computers ("palmtop" computers) have dramatically reduced size when compared to a desktop or notebook computer, the user would like to be able to perform many of the same types of functions performed using physically larger and more powerful computers. More recent implementations of such devices often have the ability of browsing the Internet using a wireless (or wired) connection. Unfortunately, the physical size of the device and it's associated display can seriously inhibit the user's browsing experience.

Most web pages are designed to display information in a format suitable for desktop and notebook computers with display resolutions of, for example, 600×800 pixels. When such pages are displayed on a much smaller display (e.g., a 160×160 pixel display), it is very difficult to effectively view the pages.

This issue has heretofore been addressed in two ways. The first is to use horizontal and vertical scrolling of a window over the original web page as illustrated in FIG. 1. In this implementation, the user scrolls a window 50 corresponding to the screen size of the hand-held device vertically and horizontally to reveal various portions of the web page. While this permits the user to access the entire web page, it is cumbersome to use and often provides an unsatisfying browsing experience.

The second mechanism used to address the problem is by using a proxy server to convert the web page to a format that can be viewed more comfortably by the hand-held device using a process called "transcoding" to translate the web page code to a more suitable format for the hand-held device. Unfortunately, using a proxy server has several disadvantages. The proxy server must generally be hosted and managed. If the proxy server is hosted by a carrier, then the browser will not be able to access intranet web pages behind a corporate firewall. Secure web pages would no longer be secure, since the proxy server must decrypt the web page prior to transcoding. If the proxy server is hosted within an enterprise, is must be internally managed within the enterprise (e.g., by the corporate Information Technology department). Also, the use of a proxy server can slow access to web pages under many circumstances.

SUMMARY OF THE INVENTION

Accordingly, what is needed is a mechanism for viewing web pages using a handheld device that does not require a proxy server and minimizes need for both horizontal and vertical scrolling.

A hand-held computer device consistent with certain embodiments of the present invention incorporates integral web page transcoding. A processor, forming a part of the handheld computer has a display coupled to the processor forming a part of the handheld computer, with the display having limited resolution of M×N pixels. A browser program running on the processor facilitates retrieving and viewing of a web page having size greater than M×N on the display. This is accomplished in a browser having an associated browser plug-in that transcodes the web page to a format adapted to the display. The transcoding is carried out by generating a menu of frames from the web page to permit a user to select a desired frame for display by selecting frame titles as menu selections; compressing an image to a size suitable for display on the M×N resolution display, wherein the image has size and pixel depth, by reducing the image's size and reducing the image's pixel depth; and converting multiple columns into a single column for display on the M×N resolution display by removing redundant table definition tags. This provides advantages of eliminating the need for a proxy server to produce web pages more suitable for display on the limited resolution display of the hand-held device.

A hand-held computer device consistent with certain embodiments of the present invention has a processor, forming a part of the handheld computer. A display is coupled to the processor forming a part of the handheld computer, the display having resolution of M×N pixels. A browser program runs on the processor to facilitate retrieving and viewing of a web page on the display, the web page having a size greater than M×N. The browser has an associated program code for transcoding the web page to a format adapted to the display.

A method of transcoding a web page within a hand-held computer device with display having resolution of M×N, consistent with certain embodiments of the present invention, includes determining if the web page contains multiple frames, and if so generating a menu of frames from the web page to permit a user to select a desired frame for display; determining if the web page contains any images, and if so compressing the images to a size suitable for display on the M×N resolution display; and determining if the web page contains multiple columns, and if so converting the multiple columns into a single column for display on the M×N resolution display.

A method of transcoding a web page within a hand-held computer device with display having resolution of M×N, consistent with certain embodiments of the present invention, includes determining if the web page contains multiple frames; and if the web page contains multiple frames, generating a menu of frames from the web page to permit a user to select a desired frame for display.

A method of transcoding a web page within a hand-held computer device with display having resolution of M×N, consistent with certain embodiments of the present invention, includes determining if the web page contains an image; and if the web page contains an image, compressing the image to a size suitable for display on the M×N resolution display.

A method of transcoding a web page within a hand-held computer device with display having resolution of M×N, consistent with certain embodiments of the present invention, includes determining if the web page contains multiple columns; and if the web page contains multiple columns, converting the multiple columns into a single column for display on the M×N resolution display.

Any of the above methods can be implemented as instructions stored on an electronic storage medium so that the method is carried out when the instructions are executed on a programmed processor forming a part of a hand-held computer.

The above summaries are intended to illustrate exemplary embodiments of the invention, which will be best understood in conjunction with the detailed description to follow, and are not intended to limit the scope of the appended claims.

DETAILED DESCRIPTION OF THE INVENTION

Figure 1:
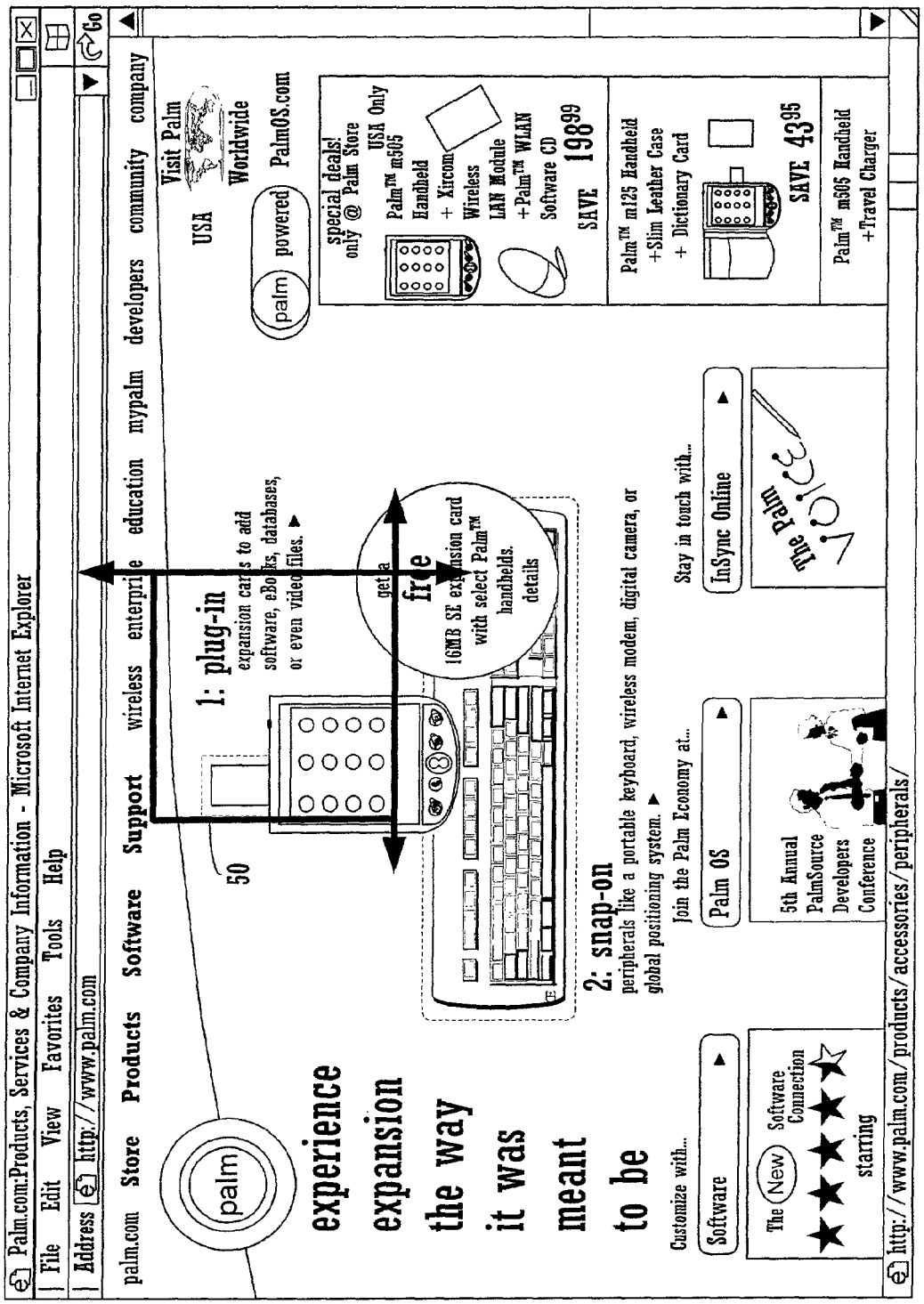
FIG. 1 illustrates a method of viewing a web page using horizontal and vertical scrolling.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "generating" or "converting" or "compressing" or "determining" or "removing" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Hand-Held Browser Transcoding in Accordance with the Present Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 2:
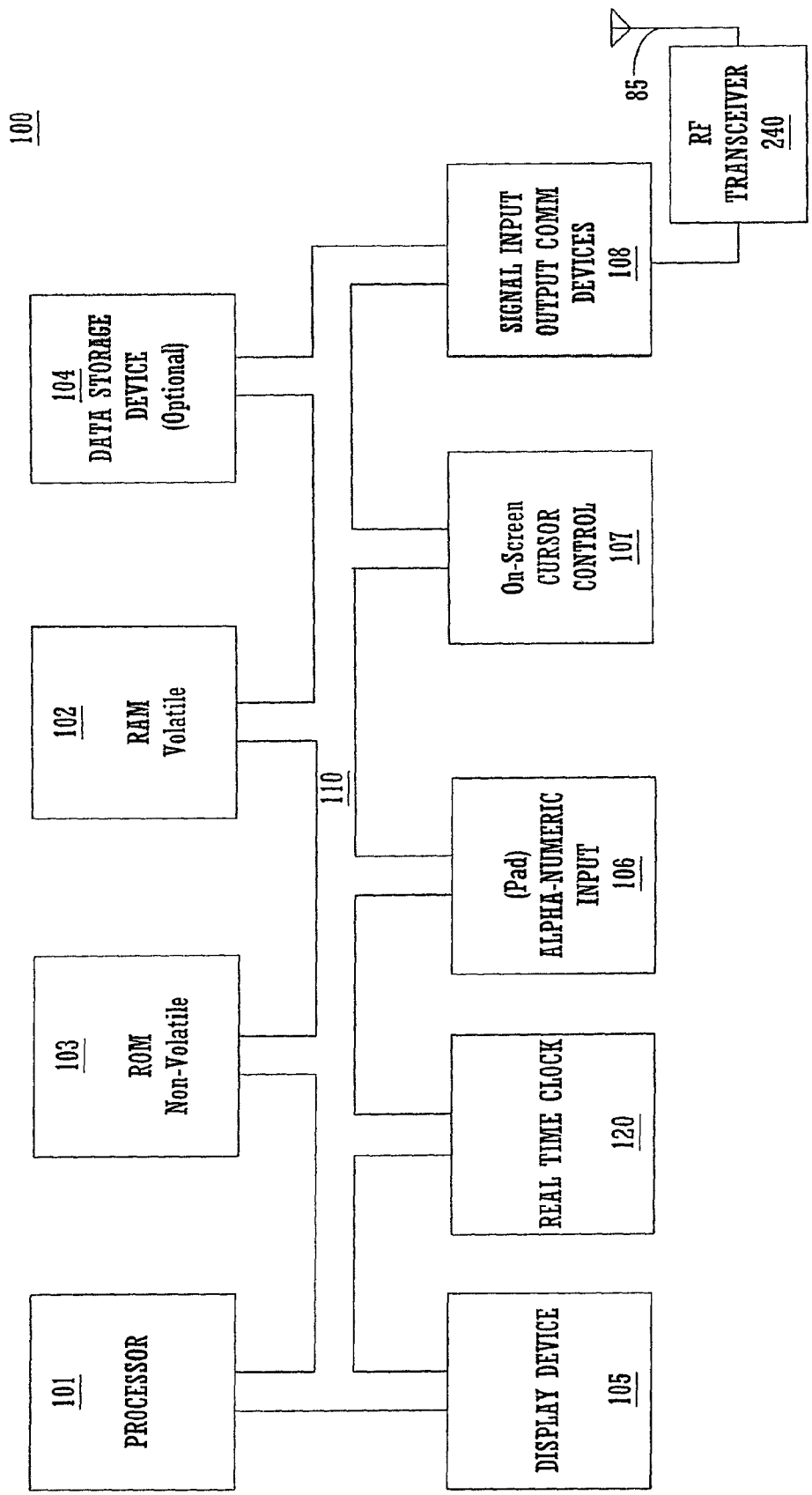
FIG. 2 is a logical block diagram of the palmtop computer system which is suitable for use in implementing certain embodiments of the present invention.

FIG. 2 illustrates circuitry of computer system 100, some of which can be implemented within the handheld device of the present invention. Examples of such hand-held devices are commercially available from Palm Computing, Inc., 5470 Great America Parkway, Santa Clara, Calif. 95054. Computing system 100 includes an address/data bus 110 for communicating information, a central processor 101 coupled with the bus for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Computer system 100 also includes an optional data storage device 104 (e.g., memory stick, SD memory, etc.) coupled with the bus 110 for storing information and instructions. Device 104 can be removed. As described above, system 100 also contains a display device 105 coupled to the bus 110 for displaying information to the computer user. The display device 105 is generally of limited resolution of M×N pixels—limited primarily by the size of the hand-held device.

Also included in computer system 100 of FIG. 2 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus for communicating user input information and command selections to the central processor 101. In one implementation, device 107 is a touch screen device incorporating with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 110 in the illustrated embodiment, can be a serial port for communicating with a host computer through a cradle. Device 108 can also include an infrared communication port. Browser software or firmware can be stored in ROM 103 and/or RAM 102 and/or data storage device 104 along with so called "plug-ins".

Figure 3:
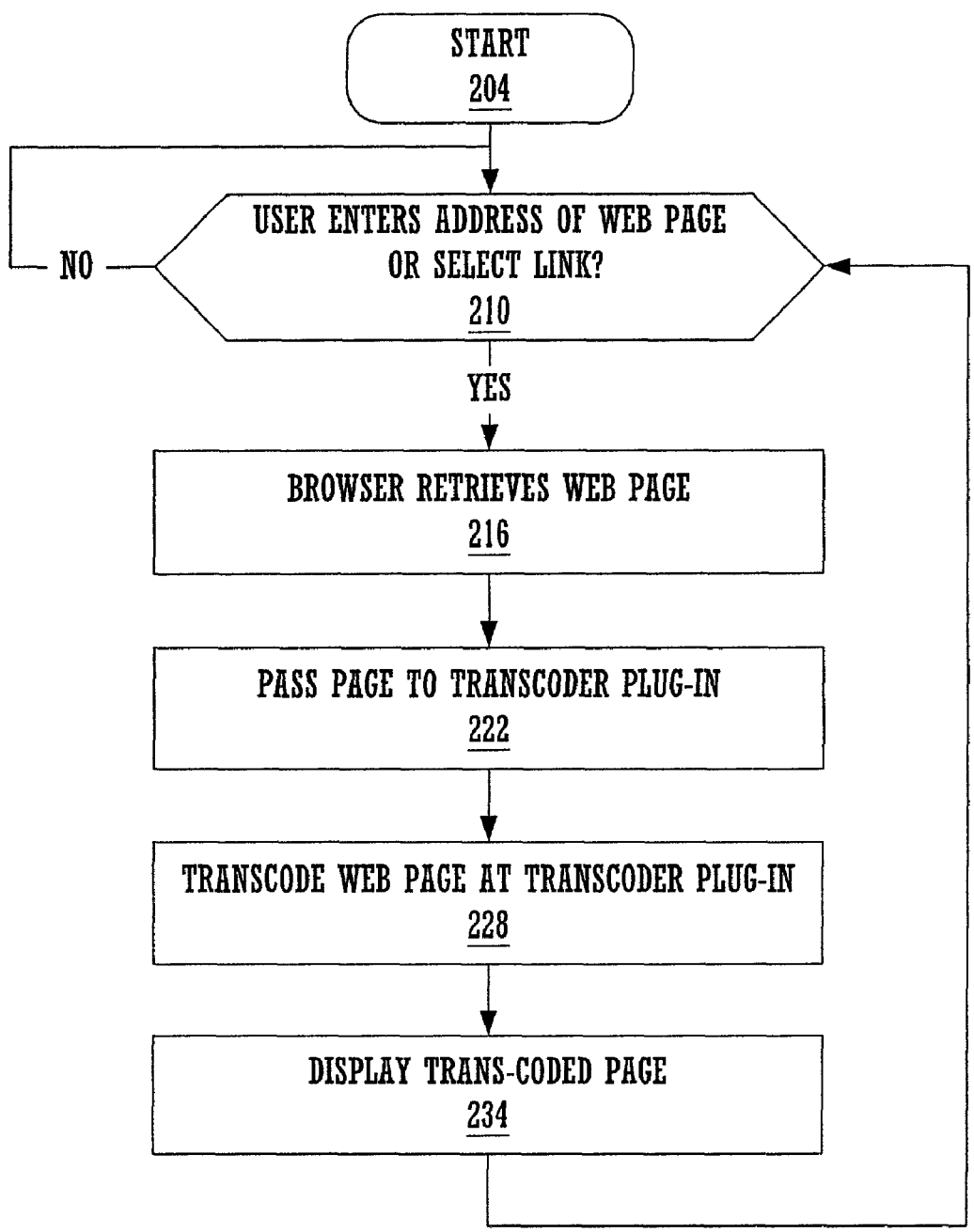
FIG. 3 is a flow chart describing the high level operation of an embodiment of the present invention.

Referring now to FIG. 3, a process 200 is illustrated, in accordance with certain embodiments of the present invention, in which a transcoding operation is carried out within the hand-held device (e.g. palmtop computer) upon receipt of a web page, without use of a proxy server (i.e., the process is proxyless). The web page, in certain embodiments can be received via a wireless connection to the Internet such as a wireless IEEE 802.11 compliant (or similar) connection which may be within an enterprise's firewall.

The process starts at 204, after which a web page is specified by the user at 210, for example, by entering the page's URL (Universal Resource Locator) or by selecting a link from another web page, document or email. The hand-held device's browser then retrieves the associated page via the connection to the Internet and passes the page to the transcoder plug-in associated with the Browser at 222 (or equivalently, passes a pointer to a memory location or a file name of a file storing the page to the plug in). The transcoder plug-in then transcodes to web page to produce a more readily viewable page at 228 and the transcoded page is then displayed on the hand-held device's display at 234.

Figure 4:
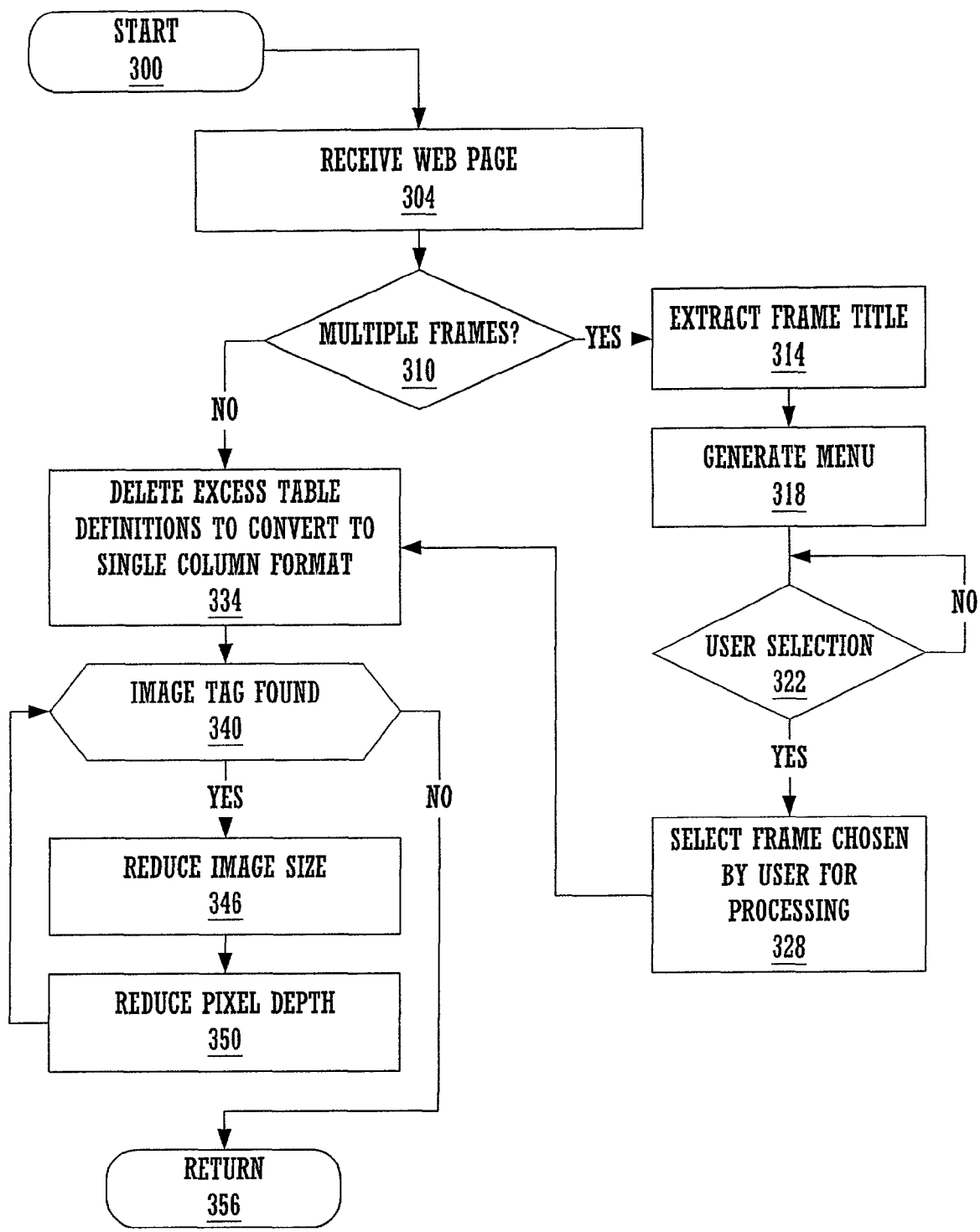
FIG. 4 is a flow chart describing a more detailed process for transcoding according to certain embodiments of the present invention.

The transcoding process of certain embodiments of the invention is described in greater detail hereinafter starting at FIG. 4. FIG. 4 shows an illustrative process 228 for transcoding the web page starting at 300. Most web pages have one or more of three elements that are addressed by the transcoder process 228—frames, tables, and images. When the web page is received at 304, it is passed to 310 to determine if there are multiple frames in the web page. If so, the user is given the opportunity to select a frame from among the frames making up the web page. This is accomplished in this embodiment by extracting the frame titles from the web page code at 314 and using these titles as items that can be selected by the user from a menu generated at 318. When the user makes selection of one of the available frames at 322, the selected frame corresponding to the user selection is taken for further processing at 328. Thus, multiple frames are dealt with by giving the user the opportunity to select among the various available frames for display.

The transcoding process proceeds at 334 if there are not multiple frames at 310 or if the user selects a frame at 322. At 334, table definitions are addressed. Multiple table definition statements within the web page are often used to create multiple columns in a web page. However, multiple columns can be troublesome to view on the small M×N pixel display of a hand-held computer device. So, the approach taken in this embodiment is to convert multiple columns into a single column format that can simply be scrolled through vertically, thus eliminating need for horizontal scrolling for the purpose of accessing multiple columns. This is accomplished in this embodiment by identifying table definition statements and deleting all table definitions except the first one. This effectively converts an arrangement of horizontally stacked columns into a single column with the original second column following the first vertically (and so on).

Table definitions in HTML (Hypertext Markup Language) and similar languages are created using table definition tages <TD> and </TD>. Removing multiple <TD> and </TD> table cell tags in HTML source code requires very little processing power to search and remove redundant table cell tags within a single table row pairing <TR> </TR>. The example of Listing 1 below illustrates the process.

Figure 5:
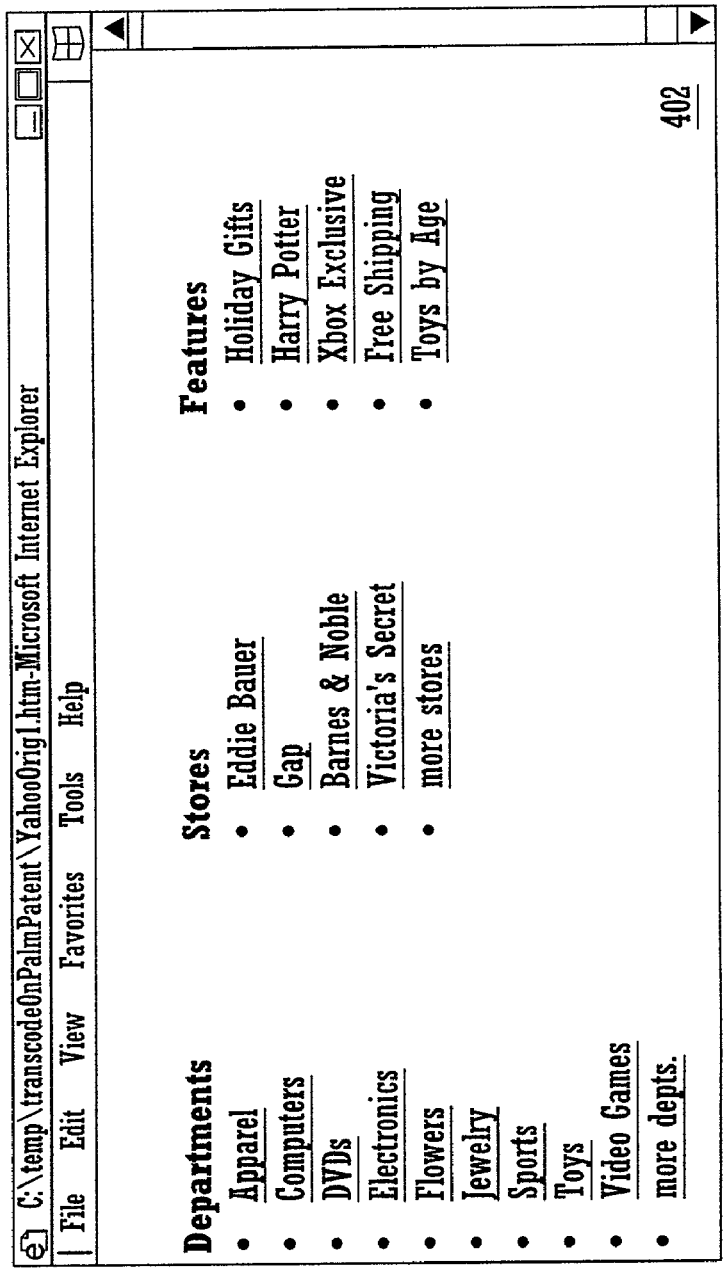
FIG. 5 shows an exemplary web page with three columns.
Figure 6:
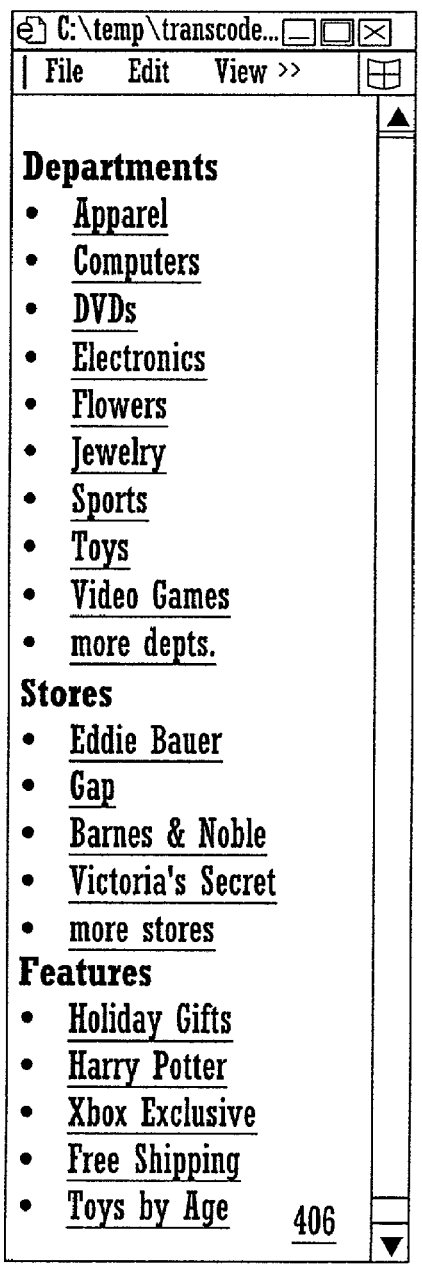
FIG. 6 shows the exemplary web page of FIG. 5 after the columns are converted to a single column.

FIG. 5 shows an original web page 402 extracted from the Yahoo YAHOO™ online web site (www.yahoo.com). Listing 1 shows the HTML source code (©Yahoo) used to implement the original web page. In order to reformat the page, the browser examines the HTML code and removes the excess <TD> and </TD> tags (all except the first) as shown in strike through in Listing 1. The resulting HTML code would be identical to that of Listing 1 with the portions show in strikethrough eliminated. With excess table cell tags removed, the web page would be rendered in a single column shown as 406 in FIG. 6 (on a conventional computer display). When rendered on a hand-held display, horizontal scrolling for the purpose of accessing multiple columns is eliminated.

Listing 1

<!DOCTYPE HTML PUBLIC "-//W3C//DTD HTML 4.0 Transitional//EN">

<HTML>

<BODY>

<TABLE border=0 cellSpacing=0 width="100%">
  <TBODY>
    <TR>
      <TD vAlign=top width="30%"><SMALL><B>Departments</B><BR>•<A href="http://www.yahoo.com/s/1021">Apparel</A><BR>•<A href="http://www.yahoo.com/s/1023">Computers</A><BR>•<A href="http://www.yahoo.com/s/1059">DVDs</A><BR>•<A href="http://www.yahoo.com/s/2509">Electronics</A><BR>•<A href="http://www.yahoo.com/s/2510">Flowers</A><BR>•<A href="http://www.yahoo.com/s/2769">Jewelry</A><BR>•<A href="http://www.yahoo.com/s/2770">Sports</A><BR>•<A href="http://www.yahoo.com/s/2511">Toys</A><BR>•<A href="http://www.yahoo.com/s/2512">Video Games</A><BR>•<A href="http://www.yahoo.com/s/1020"> more depts.</A><BR></SMALL>

<SMALL><B>Stores</B><BR>•<A href="http://www.yahoo.com/s/1194">Eddie Bauer</A><BR>•<A href="http://www.yahoo.com/s/1195">Gap</A><BR>•<A href="http://www.yahoo.com/s/1196">Barnes &

Noble</A><BR>•<A href="http://www.yahoo.com/s/1197">Victoria's

Secret</A><BR>•<A href="http://www.yahoo.com/s/1062">more stores</A><BR></SMALL>

<SMALL><B>Features</B><BR>•<A

```
href="http://www.yahoo.com/s/2793">Holiday Gifts</
   A><BR>•
<A
   href="http://www.yahoo.com/s/1356">Harry Potter</
   A><BR>•
<A
   href="http://www.yahoo.com/s/2730">Xbox Exclusive</
   A><BR>•
<A
   href="http://www.yahoo.com/s/2794">Free Shipping</
   A><BR>•
<A
   href="http://www.yahoo.com/s/2775">Toys by
Age</A><BR></SMALL>
   </TD>
   </TR>
   </TBODY>
</TABLE>
</BODY>
</HTML>
```

Returning to FIG. 4, the final issue that is addressed is that of images. Images provided on web pages often have more information than can reasonably be displayed on the limited resolution M×N pixel display of the hand-held device. Accordingly, the approach taken in this embodiment to address the problems of images is to reduce the size and pixel depth of the images. This is done by first finding an image tag at 340. (If none is found, processing is unnecessary as indicated.) For each image tag found, the image is retrieved and processed by reducing the image's size at 346 to a size that can be displayed in the M×N pixel display and reducing the image's pixel depth (e.g., by compressing the image's gray scale and/or reducing the number of colors) at 350.

Other arrangements for reducing the image size for display on a small display are known and can be used in conjunction with the present invention. The most common image formats used in web pages are GIF and JPG. These image formats support easy reduction using the relatively small computing horsepower available in the handheld. Many handheld applications such as those described above are already available which reduce images. For example, the image processing can be carried out using algorithms used in the commercially available IA ALBUM™ product available from IA Style, Inc. or MGI PHOTOSUITE™ available from MGI Software Corp. or DreamHouse POCKETPHOTO™ available from Dreamhouse Software, Inc. When the last image is processed, the plug-in returns the transcoded web page (or a pointer thereto) for display.

As described, Images embedded in web pages should be scaled down for viewing on the handheld. When using a proxy-assisted browser, image reduction of both size and pixel depth is typically performed on the proxy server prior to delivery to the handheld. But in the current proxyless environment, the handheld device implements the image reduction process. In the embodiment described herein, a plugin architecture is used in the handheld device's browser so that image manipulation applications can be registered and leveraged. The plugin is a standalone application that receives a file pointer as input and returns a file pointer back to the browser.

When a web page contains an image, the browser saves that image to a file and passes the file pointer to the plugin. The plugin reduces the image, saves the result into a new file, and passes a new file pointer back to the browser. The browser references the new file pointer when displaying the image.

Figure 7:
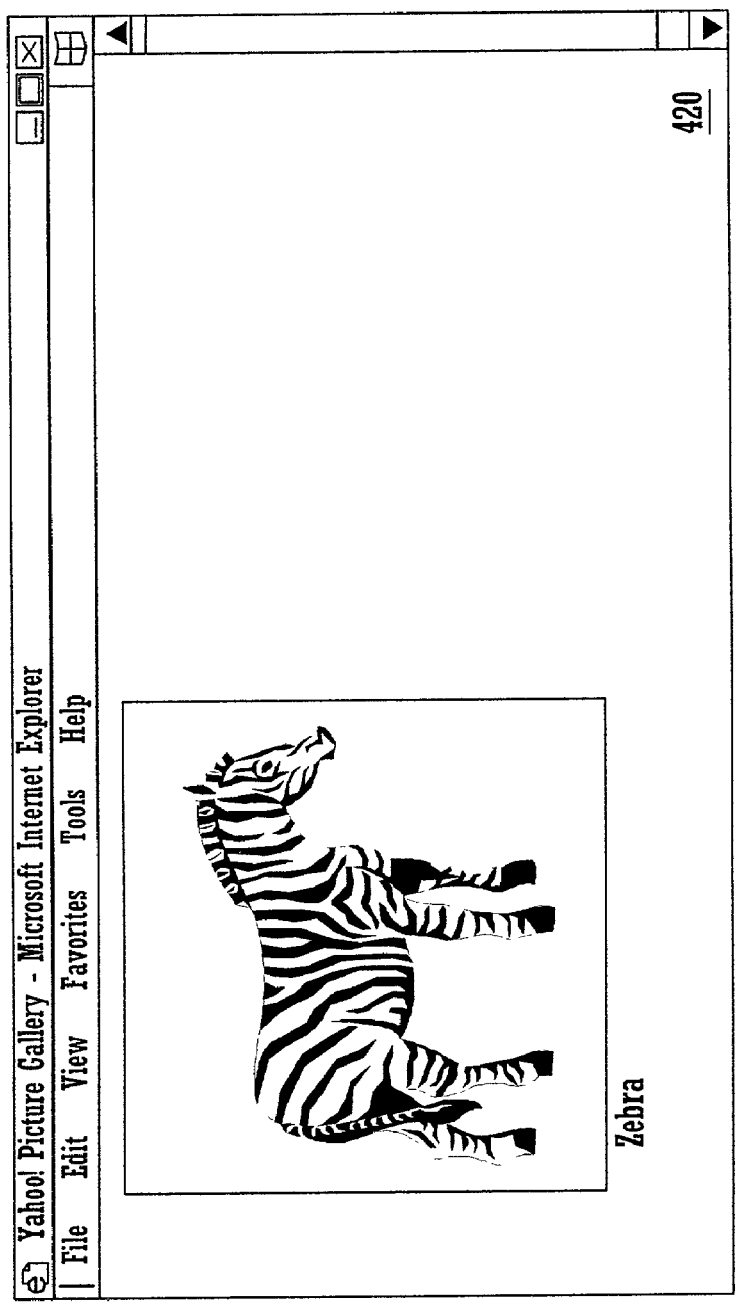
FIG. 7 shows an exemplary web page image.
Figure 8:
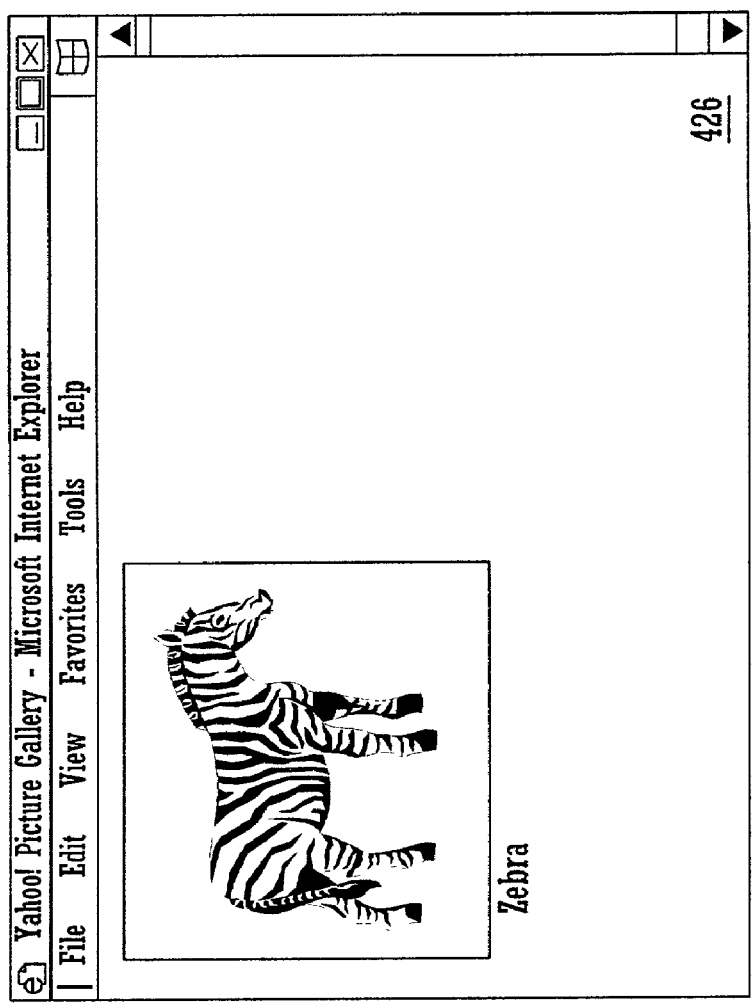
FIG. 8 shows the exemplary web page image of FIG. 7 after the image has been size reduced.

The following example illustrates the process. A web page containing an image of a zebra is referenced with an HTML <img src= . . . > tag. FIG. 7 shows the web page 420 and Listing 2 shows the HTML source code used to create it. The handheld browser, upon receiving the <img src= . . . > tag first extracts the image to a local file, as shown as pseudocode in Listing 3. In this example, the local file is named "C:\temp\transcodeOnPalmPatent\10922944.jpg". The browser passes a pointer to this file to the image processing plugin, which reduces and stores the image to a new file named "C:\temp\transcodeOnPalmPatent\reduced\10922944.jpg", and returns this file pointer back to the browser. Listing 4 shows that the browser references the newly reduced file in the HTML <img src= . . . > tag and FIG. 8 shows the resulting rendered web page 426 with a reduced image.

Listing 2

```
<html><head><title>Yahoo! Picture Gallery</title></head>
<body bgcolor="#ffffff">
<img     src="http://gallery.yimg.com/c/256wm/
10922944.jpg"
   width=170 height=256 border=1><br>
<font size="+1"><b>Zebra </b></font><br>
</body></html>
```

Listing 3

ORIGINAL IMAGE AT:

http://gallery.yimg.com/c/256wm/10922944.jpg

BROWSER EXTRACTS TO: C:\temp\transcodeOnPalmPatent\10922944.jpg

BROWSER PASSES FILE POINTER TO IMAGE PROCESSING APPLICATION

IMAGE PROCESSING APP REDUCES FILE, STORES TO:
   C:\temp\transcodeOnPalmPatent\reduced\10922944.jpg

IMAGE PROCESSING APP NEW FILE POINTER TO BROWSER

Listing 4

```
<html><head><title>Yahoo! Picture Gallery</title></head>
<body bgcolor="#ffffff">
<img                            src="C:
\temp\transcodeOnPalmPatent\reduced\10922944.jpg"
   width=85 height=128 border=1><br>
<font size="+1"><b>Zebra </b></font><br>
</body></html>
```

Those skilled in the art will appreciate that the order of the operations described above can be modified and the processing of images and tables can be carried out in any order or simultaneously within the scope of this embodiment of the invention. Also, although the examples shown are illustrated using HTML coding, this should not be considered limiting since similar equivalent processes can be devised to handle other languages including, but not limited to XML and Java, without departing from the present invention. Moreover, although the present invention is described as a plug-in for browser software, other implementations are possible including incorporation within the browser software.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

The present invention is preferably implemented using a programmed processor such as processor 101 executing programming instructions that are broadly described above in flow chart form and can be stored on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of processing data using a portable electronic device, said method comprising:
   accessing first data comprising a web page;
   transcoding, using a processor of said portable electronic device to execute code stored on said portable electronic device, said first data to generate second data; and
   displaying, using a display device of said portable electronic device, said second data.

2. The method of claim 1, wherein said displaying further comprises displaying said second data using a browser program, and wherein said transcoding further comprises transcoding said first data using a plug-in associated with said browser program.

3. The method of claim 1, wherein said first data comprises a plurality of frames, wherein said transcoding further comprises generating a menu associated with said plurality of frames, wherein said menu enables user selection of a particular frame of said plurality of frames, wherein said transcoding further comprises generating said second data to include a portion of said first data associated with said particular frame, and wherein said displaying further comprises displaying said portion of said first data associated with said particular frame.

4. The method of claim 1, wherein said web page comprises an image, and wherein said transcoding further comprises reducing a size of said image.

5. The method of claim 1, wherein said transcoding further comprises reducing said size of said image from a first size to a second size, wherein said second size is less than a resolution of said display device.

6. The method of claim 1, wherein said web page comprises an image, and wherein said transcoding further comprises reducing a pixel depth of said image.

7. The method of claim 1, wherein said transcoding further comprises reducing a number of columns of said web page.

8. The method of claim 1, wherein said transcoding further comprises removing redundant table definition tags to reduce a number of columns of said web page.

9. A portable electronic device comprising:
   a processor operable to transcode first data to generate second data, wherein said first data comprises a web page, and wherein said processor is further operable to transcode said first data by executing code stored on said portable electronic device; and
   a display device operable to display said second data.

10. The portable electronic device of claim 9, wherein said display device is further operable to display said second data using a browser program, and wherein said processor is further operable to transcode said first data using a plug-in associated with said browser program.

11. The portable electronic device of claim 9, wherein said first data comprises a plurality of frames, wherein said processor is further operable to generate a menu associated with said plurality of frames, wherein said menu enables user selection of a particular frame of said plurality of frames, wherein said processor is further operable to generate said second data to include a portion of said first data associated with said particular frame, and wherein said display device is further operable to display said portion of said first data associated with said particular frame.

12. The portable electronic device of claim 9, wherein said web page comprises an image, and wherein said processor is further operable to reduce a size of said image.

13. The portable electronic device of claim 9, wherein said processor is further operable to reduce said size of said image from a first size to a second size, wherein said second size is less than a resolution of said display device.

14. The portable electronic device of claim 9, wherein said web page comprises an image, and wherein said processor is further operable to reduce a pixel depth of said image.

15. The portable electronic device of claim 9, wherein said processor is further operable to reduce a number of columns of said web page.

16. The portable electronic device of claim 9, wherein said processor is further operable to remove redundant table definition tags to reduce a number of columns of said web page.

17. A method of processing data using a portable electronic device, said method comprising:
   accessing first data comprising a web page;
   transcoding, using an application stored on said portable electronic device, said first data to generate second data, wherein said transcoding further comprises modifying said web page in accordance with an attribute of said portable electronic device; and
   displaying, using a display device of said portable electronic device, said second data.

* * * * *